(12) United States Patent
Ariga et al.

(10) Patent No.: US 10,970,521 B2
(45) Date of Patent: Apr. 6, 2021

(54) IMAGE PROCESSING APPARATUS AND IMAGE PROCESSING METHOD

(71) Applicant: TOSHIBA TEC KABUSHIKI KAISHA, Tokyo (JP)

(72) Inventors: Norimasa Ariga, Izunokuni Shizuoka (JP); Kazuki Taira, Ota Tokyo (JP); Masaaki Yasunaga, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/726,776

(22) Filed: Dec. 24, 2019

(65) Prior Publication Data
US 2020/0134292 A1    Apr. 30, 2020

Related U.S. Application Data

(63) Continuation of application No. 15/848,011, filed on Dec. 20, 2017, now abandoned.

(30) Foreign Application Priority Data

Dec. 22, 2016    (JP) .............................. JP2016-249568

(51) Int. Cl.
*G06K 9/00* (2006.01)
*G06T 7/73* (2017.01)
*G06T 7/90* (2017.01)
*G06T 1/00* (2006.01)
(Continued)

(52) U.S. Cl.
CPC ....... *G06K 9/00208* (2013.01); *G06F 16/583* (2019.01); *G06K 9/03* (2013.01);
(Continued)

(58) Field of Classification Search
CPC .... G06K 9/00208; G06K 9/03; G06K 9/4652; G06K 9/3216; H04N 1/6033;
(Continued)

(56) References Cited

U.S. PATENT DOCUMENTS

| 6,333,511 B1 | 12/2001 | Talmi |
| 9,193,073 B1 | 11/2015 | Huang et al. |

(Continued)

FOREIGN PATENT DOCUMENTS

| JP | 2002218491 A | 8/2002 |
| JP | 2009187482 A | 8/2009 |

(Continued)

OTHER PUBLICATIONS

Notice of Reasons for Refusal dated Nov. 10, 2020 in corresponding Japanese Patent Application No. 2016-249568, 6 pages (with Translation).

*Primary Examiner* — Jerome Grant, II
(74) *Attorney, Agent, or Firm* — Kim & Stewart LLP

(57) ABSTRACT

An autonomous inventory tracking apparatus includes an image acquisition unit configured to acquire an image, and a processor configured to detect a calibration plate in the image acquired from the image acquisition unit, calculate a color correction value for the image according to a color block of the calibration plate, the color block matching a reference value, correct color in the image using the calculated color correction value to provide a color-corrected image, and perform commodity recognition processing on the color-corrected image so as to identify the commodity in the image acquired from the image acquisition unit.

20 Claims, 9 Drawing Sheets

(51) Int. Cl.
*G06F 16/583* (2019.01)
*G06K 9/03* (2006.01)
*G06K 9/46* (2006.01)
*H04N 1/60* (2006.01)
*G06K 9/32* (2006.01)

(52) U.S. Cl.
CPC .......... *G06K 9/4652* (2013.01); *G06T 1/0007* (2013.01); *G06T 7/74* (2017.01); *G06T 7/90* (2017.01); *H04N 1/6033* (2013.01); *G06K 9/3216* (2013.01); *G06T 2207/10024* (2013.01)

(58) Field of Classification Search
CPC . G06F 16/583; G06T 7/74; G06T 7/90; G06T 1/0007; G06T 2207/10024
USPC ........................................................ 382/165
See application file for complete search history.

(56) References Cited

U.S. PATENT DOCUMENTS

| | | |
|---|---|---|
| 9,933,515 B2 | 4/2018 | Prokhorov |
| 2003/0160877 A1 | 8/2003 | Sumida |
| 2010/0017407 A1 | 1/2010 | Beniyama et al. |
| 2016/0048798 A1 | 2/2016 | Meyer et al. |
| 2016/0364869 A1 | 12/2016 | Siercks et al. |
| 2017/0249491 A1 | 8/2017 | MacIntosh et al. |
| 2017/0293788 A1 | 10/2017 | Taira et al. |
| 2018/0345493 A1 | 12/2018 | Kokubo |
| 2018/0354130 A1 | 12/2018 | Preisinger et al. |

FOREIGN PATENT DOCUMENTS

| | | |
|---|---|---|
| JP | 2012089174 A | 5/2012 |
| JP | 2014127857 A | 7/2014 |

| COMMODITY NAME | COMMODITY CODE | DICTIONARY IMAGE FILE NAME |
|---|---|---|
| TEA | 0000 | img_0000 |
| COFFEE | 0001 | img_0001 |
| POTATO CHIP | 0002 | img_0002 |
| CHOCOLATE | 0003 | img_0003 |

FIG. 6
| ROUTE NAME | STOP POSITION |
|---|---|
| ROUTE 1 | A0 A1 A2 A3 A4 A5 A6 A7 |
| ROUTE 2 | A7 A6 A5 A4 A3 A2 A1 A0 |
| ROUTE 3 | B0 B1 B2 B3 B4 B5 B6 B7 |
| ROUTE 4 | B7 B6 B5 B4 B3 B2 B1 B0 |
FIG. 7
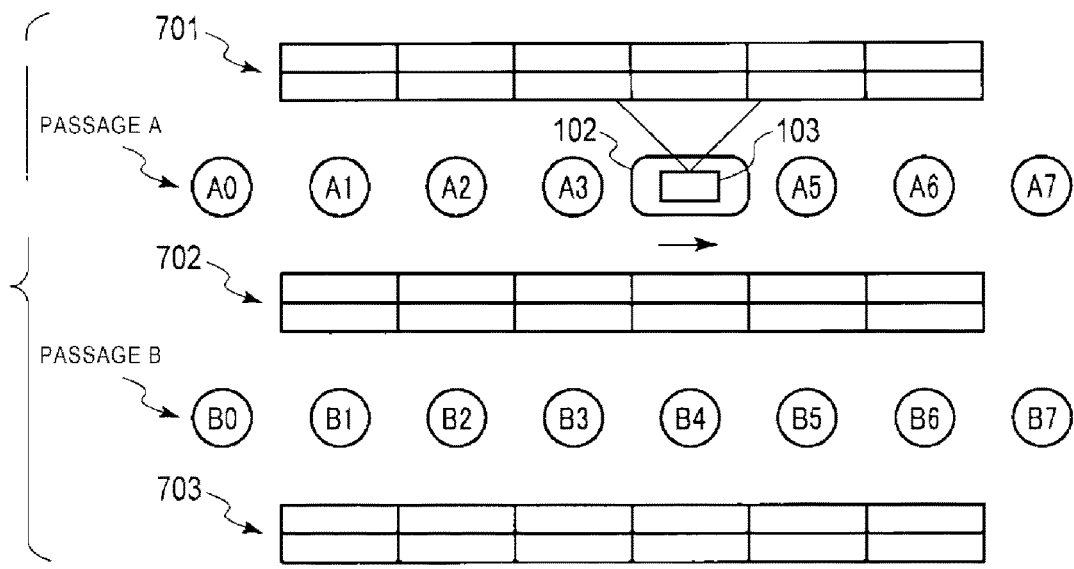
FIG. 8
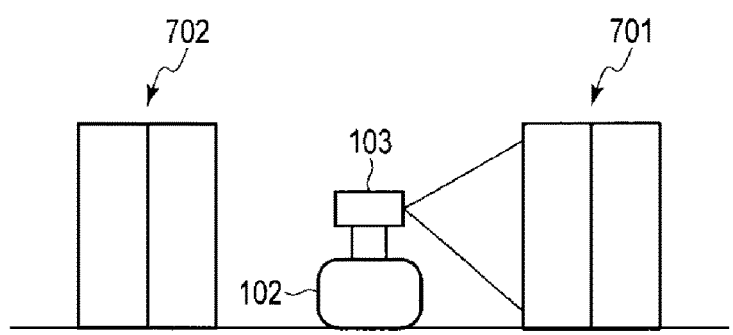

IMAGE PROCESSING APPARATUS AND IMAGE PROCESSING METHOD

CROSS-REFERENCE TO RELATED APPLICATION

This application is a continuation of U.S. patent application Ser. No. 15/848,011, filed Dec. 20, 2017, which application is based upon and claims the benefit of priority from Japanese Patent Application No. 2016-249568, filed Dec. 22, 2016, the entire contents of which are incorporated herein by reference.

FIELD

Embodiments described herein relate generally to an image processing apparatus and an image processing method.

BACKGROUND

In the related art, an image processing apparatus acquires an image of a shelf or the like on which a commodity is disposed, and recognizes the commodity in the image. A color of the commodity in the image may be different from the color pre-registered for the commodity due to various factors such as differences in a position and characteristics of a camera used to capture the image of the commodity on the shelf, and lighting around the shelf when the image was acquired.

In some related art examples, a mobile robot must internally maintain an environment map so as to match the external environment of the mobile robot to prevent a self-positioning function of the mobile robot from deteriorating.

However, even though such an environment map is created so as to match the surrounding external environment, an error in the stopping position of the robot may still occur. Accordingly, repeated images from the exact same position will not necessarily be obtained by such a robot, and the deterioration of the commodity recognition may occur due to the difference in colors of the commodity, if such color differences are not compensated.

If the color of the commodity in the image is different from the pre-registered or expected color of the commodity, accuracy of recognition of the commodity from the captured image decreases in the image processing apparatus.

When an image processing apparatus mounted on an autonomous driving robot images the commodity shelf in which the commodity is disposed, the mobile robot can drive a predetermined route based on estimated self-positioning of the robot. However, if the environment map stored by the mobile robot is different from the actual environment, the self-positioning function of the mobile robot deteriorates and an error in the robot positioning occurs. As such, there can also be a problem in that a particular commodity may not be captured as the image correctly due to an error in the stop positioning of the robot.

DESCRIPTION OF THE DRAWINGS

FIG. 6 is a diagram of a route table.
FIG. 7 is a diagram of a robot apparatus.
FIG. 8 is a diagram of a robot apparatus.

DETAILED DESCRIPTION

In general, according to embodiments, an autonomous inventory tracking apparatus includes an image acquisition unit configured to acquire an image, and a processor configured to detect a calibration plate in the image acquired from the image acquisition unit, calculate a color correction value for the image according to a color block of the calibration plate, the color block matching a reference value, color correct the image using the calculated color correction value to provide a color-corrected image, and perform commodity recognition processing on the color-corrected image so as to identify the commodity in the image acquired from the image acquisition unit.

Hereinafter, embodiments will be described with reference to drawings.

An image processing system according to embodiments detects a commodity which is disposed in a commodity shelf based on an image of the commodity shelf or the like in which the commodity is disposed, for example, in a store.

Figure 1:
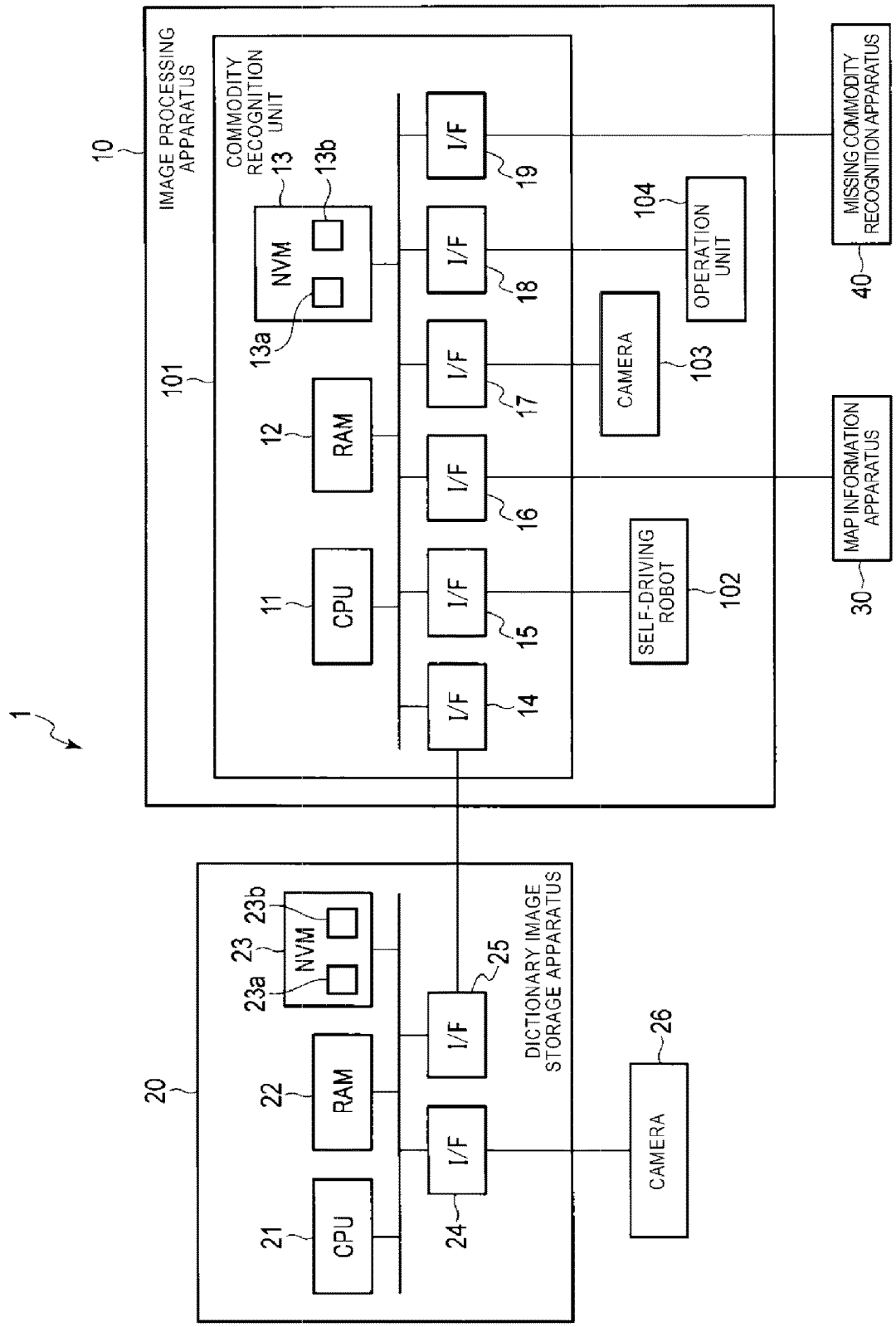
FIG. 1 is a block diagram of an image processing system.

FIG. 1 is a block diagram of an image processing system 1.

As illustrated in FIG. 1, the image processing system 1 includes an image processing apparatus 10, a dictionary image storage apparatus 20, a map information apparatus 30, and a missing commodity recognition apparatus 40.

The image processing apparatus 10 detects a commodity based on a captured image of a commodity shelf or the like in which the commodity is placed.

The dictionary image storage apparatus 20 stores an image of a commodity (also referred to as a dictionary image) which is necessary for the image processing apparatus 10 to detect the commodity.

The map information apparatus 30 provides map information indicating a map inside a store having the image processing system 1 installed to the image processing apparatus 10.

The missing commodity recognition apparatus 40 detects a missing commodity based on the commodity that has been detected by the image processing apparatus 10. The missing commodity recognition apparatus 40 detects the missing commodity based on information indicating a commodity that has been pre-registered for a certain position in the commodity shelf and the commodity that has been detected at that position in the commodity shelf.

As illustrated in FIG. 1, the image processing apparatus 10 includes a commodity recognition unit 101, a self-driving robot 102, a camera 103, an operation unit 104, and the like. The commodity recognition unit 101 includes a central processing unit (CPU) 11, a random access memory (RAM) 12, a non-volatile memory (NVM) 13, and interfaces (I/F) 14 to 19. The elements of the commodity recognition unit 101 are connected to each other through a data bus or the like. The commodity recognition unit 101 may have more elements in addition to the elements depicted in FIG. 1, or some of the elements depicted in FIG. 1 may be omitted in some embodiments.

The CPU 11 has a function of controlling the overall operation of the commodity recognition unit 101. The CPU 11 may include an internal cache, various interfaces, and the like. The CPU 11 executes a program stored in an internal memory or NVM 13 in advance to provide various processing operations. The CPU 11 is, for example, a processor.

Some of the processing operations by the CPU 11 executing a program may be realized via a hardware circuit. In this case, the CPU 11 controls an operation of the hardware circuit.

The RAM 12 is a volatile memory. The RAM 12 temporarily stores data of CPU 11 in processing or the like. The RAM 12 stores various application programs based on an instruction from the CPU 11. The RAM 12 may store data which is necessary for executing the application program, an execution result of the application program, and the like.

The NVM 13 is a non-volatile memory capable of writing and rewriting of data. The NVM 13 may be, for example, a (solid-state drive) SSD, an EEPROM®, a flash memory, or the like. The NVM 13 stores a control program, an application program, and various data according to an operational purpose of the commodity recognition unit 101.

The NVM 13 includes a storage region 13a that stores a reference color table, a storage region 13b that stores a route table, and the like.

The interface 14 is an interface for communicating data with the dictionary image storage apparatus 20. The CPU 11 acquires the dictionary image or the like from the dictionary image storage apparatus 20 through the interface 14.

The interface 15 is an interface for communicating data with the self-driving robot 102. For example, the CPU 11 sets a stop position or the like on the self-driving robot 102 through the interface 15.

The interface 16 is an interface for communicating data with the map information apparatus 30. For example, the CPU 11 acquires map information from the map information apparatus 30 through the interface 16.

The interface 17 is an interface for communicating data with the camera 103. For example, the CPU 11 acquires a captured image from the camera 103 through the interface 17.

The interface 18 is an interface for communicating data with the operation unit 104. For example, the CPU 11 acquires an operation input into the operation unit 104 through the interface 18.

The interface 19 is an interface for communicating data with the missing commodity recognition apparatus 40. For example, the CPU 11 transmits information indicating a recognized commodity to the missing commodity recognition apparatus 40 through the interface 19.

The interfaces 14 to 19 support wireless connection or wired connection protocols. For example, the interfaces 14 to 19 may support a local area network (LAN) protocol or a Universal Serial Bus (USB) protocol.

The self-driving robot 102 is a mobile object that carries the camera 103. The self-driving robot 102 includes a main body to mount the camera, a motor, a tire, and the like. The self-driving robot 102 moves by rotating the tire using driving force of the motor. The self-driving robot 102 can move with the camera 103 mounted to a predetermined position. The self-driving robot 102 may include a mechanism for changing a position and an angle of the camera 103. The self-driving robot 102 may include a sensor for detecting its own position.

The self-driving robot 102 moves based on a signal from the commodity recognition unit 101. For example, the self-driving robot 102 receives information including a stop position from the commodity recognition unit 101. The self-driving robot 102 moves to and then stops at the stop position.

The self-driving robot 102 may determine a stop position based on a calibration plate. For example, the self-driving robot 102 detects the calibration plate based on an image of the calibration plate captured by the camera 103. The self-driving robot 102 may adjust the stop position based on a position of the detected calibration plate or the like.

The camera 103 captures images of a commodity. The camera 103 captures an image of a commodity shelf in which the commodity is disposed. The camera 103 is mounted on the self-driving robot 102 at a predetermined height. For example, the camera 103 is installed at a height at which a predetermined commodity shelf can be imaged.

The camera 103 may capture an image according to a signal from the commodity recognition unit 101. The camera 103 may capture an image when the self-driving robot 102 stops at a stop position. The camera 103 transmits the captured image to the commodity recognition unit 101.

The camera 103 is, for example, a charge coupled device (CCD) camera.

The operation unit 104 receives various operation instructions by an operator. The operation unit 104 transmits, to the commodity recognition unit 101, a signal indicating the operation instruction input by the operator. The operation unit 104 is, for example, a keyboard, a numeric keypad, and a touch panel.

As illustrated in FIG. 1, the dictionary image storage apparatus 20 includes a CPU 21, a RAM 22, an NVM 23, interfaces (I/F) 24 and 25, and the like. The elements in the dictionary image storage apparatus 20 are connected to each other through a data bus or the like. The dictionary image storage apparatus 20 may have more elements in addition to the elements depicted in FIG. 1, or some of the elements depicted in FIG. 1 may be omitted. The dictionary image storage apparatus 20 is connected to a camera 26.

The CPU 21 has a function of controlling the overall operation of the dictionary image storage apparatus 20. The CPU 21 may include an internal cache, various interfaces, and the like. The CPU 21 executes a program stored in an internal memory or NVM 23 in advance to provide various processing. The CPU 21 is, for example, a processor.

Some of the processing operations by the CPU 21 executing a program may be realized via a hardware circuit. In this case, the CPU 21 controls an operation of the hardware circuit.

The RAM 22 is a volatile memory. The RAM 22 temporarily stores data of CPU 21 in processing or the like. The RAM 22 stores various application programs based on an instruction from the CPU 21. The RAM 22 may store data which is necessary for executing the application program, an execution result of the application program, and the like.

The NVM 23 is a non-volatile memory capable of writing and rewriting of data. The NVM 23 may be a hard disk, an SSD, an EEPROM®, a flash memory, or the like. The NVM 23 stores a control program, an application program, and various data according to an operational purpose of the dictionary image storage apparatus 20.

The NVM 23 includes a storage region 23a that stores a reference color table, a storage region 23b that stores a commodity table and the like.

The interface 25 is an interface for communicating data with the commodity recognition unit 101. For example, the CPU 21 transmits the dictionary image or the like to the commodity recognition unit 101 through the interface 25.

The interface 24 is an interface for communicating data with the camera 26. For example, the CPU 21 acquires a captured image or the like from the camera 26 through the interface 24.

The interfaces 24 and 25 support wireless connection or wired connection protocols. For example, the interfaces 24 and 25 may support a LAN protocol or a USB protocol.

The camera 26 captures an image of a commodity. The camera 26 may capture an image according to an operator's instruction. The camera 26 transmits the captured image to the dictionary image storage apparatus 20. The camera 26 may transmit the captured image to the dictionary image storage apparatus 20, at the time of capturing the image. The camera 26 may transmit the captured images to the dictionary image storage apparatus 20, at a predetermined interval or after the camera has captured the predetermined number of images. The camera 26 may store the image in a detachable memory, and the dictionary image storage apparatus 20 may acquire the image from the detachable memory.

The camera 26 is, for example, a CCD camera or the like.

The CPU 21 has a function of acquiring an image of a commodity and a calibration plate captured by the camera 26.

The CPU 21 acquires a captured image from the camera 26. The camera 26 may store a captured image to a detachable memory, and the CPU 21 may acquire the captured image from the detachable memory.

Figure 2:
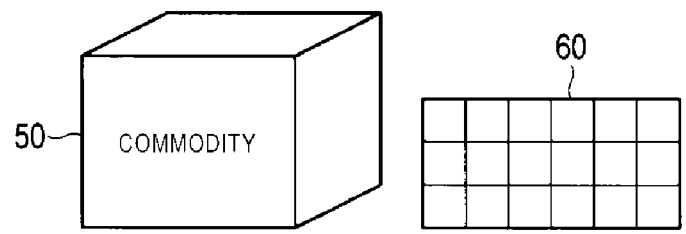
FIG. 2 is a diagram of a dictionary image storage apparatus.
Figure 2:
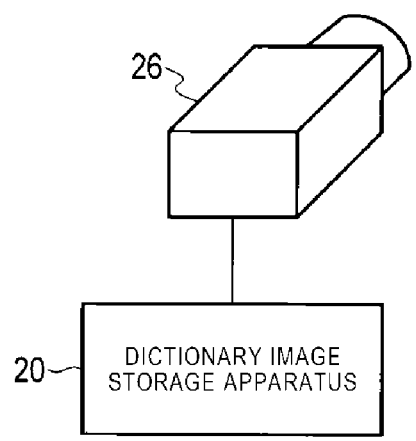

FIG. 2 illustrates an operation example in which the CPU 21 acquires a captured image.

As illustrated in FIG. 2, the camera 26 captures an image of a commodity 50 and a calibration plate 60. The commodity 50 and the calibration plate 60 are disposed adjacent each other so as to be contained in one captured image. The positional relationship between the commodity 50 and the calibration plate 60 is not limited to a specific configuration.

The calibration plate 60 is a plate having a plurality of blocks in different colors.

Figure 3:
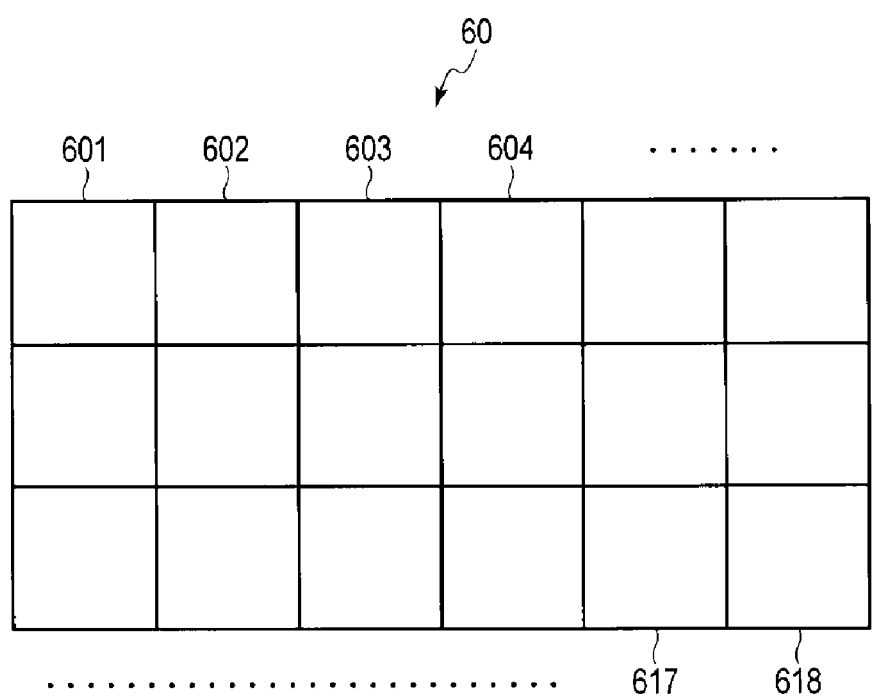
FIG. 3 is a diagram of a calibration plate.

FIG. 3 illustrates an example of the calibration plate 60.

As illustrated in FIG. 3, the calibration plate 60 includes blocks 601 to 618. Each of the blocks 601 to 618 has different colors. Each of the blocks 601 to 618 may be individually membered. The blocks 601 to 618 may be regions in which inks of predetermined colors are painted on the calibration plate 60.

In the example illustrated in FIG. 3, the calibration plate 60 includes 18 blocks. The calibration plate 60 may include three or more, or nine or more blocks. The number of blocks on the calibration plate 60 is not limited to a specific number.

The CPU 21 has a function of generating a correction matrix, including correction values, based on the captured image of the calibration plate 60.

The correction matrix is a matrix that maps a color of a block of the calibration plate 60 in the captured image to an actual color of the block. The correction matrix can eliminate color deviation due to camera characteristics, external light, or the like.

The CPU 21 extracts a region of the captured image corresponding to the calibration plate 60, using a pattern recognition algorithm or the like.

Upon extracting the region of the image corresponding to the calibration plate 60, the CPU 21 extracts color information of each block of the calibration plate 60 from the extracted image. The CPU 21 detects a position of each block from the extracted image. The CPU 21 extracts the color information of the position of each block. Here, the color information indicates colors in RGB format.

Upon extracting the color information, the CPU 21 acquires reference color information of each block of the calibration plate 60.

The CPU 21 acquires the reference color information from the reference color table stored in the storage region 23a.

The reference color table stores the reference color information, indicating reference colors of blocks of the calibration plate 60 individually. The reference color indicates a block color registered in advance. For example, the reference color may be an actual color specified by an ink used to print the block, or a block color imaged under a predetermined condition.

The reference color table stores information indicating a location of the a block, for example, a position or a label of a block, and reference color information indicating a reference color of the block in a correlated manner.

The reference color information indicates colors, for example, in RGB format. The reference color information may include Rs, Gs, and Bs.

The storage region 23a stores the reference color table in advance.

The reference color table stored in the storage region 13a is the same as the reference color table stored in the storage region 23a.

Upon acquiring the reference color information of each block, the CPU 21 generates a correction matrix based on the color information and the reference color information of each block.

For example, the CPU 21 calculates a correction matrix A satisfying the following Equation (1):

$$\begin{pmatrix} R_s \\ G_s \\ B_s \end{pmatrix} = A \begin{pmatrix} R \\ G \\ B \end{pmatrix} \quad \text{Equation (1)}$$

Here, Rs, Gs, and Bs are reference color information for one block of the calibration plate 60. R, G, and B are color information of the block extracted from the extracted image. A is a correction matrix.

For example, A is represented by the following Equation (2):

$$A = \begin{pmatrix} a_{11} & \cdots & a_{13} \\ \vdots & \ddots & \vdots \\ a_{31} & \cdots & a_{33} \end{pmatrix} \quad \text{Equation (2)}$$

Here, $a_{11}$ to $a_{33}$ are correction values as elements of the correction matrix A.

The CPU 21 generates the correction matrix A using the reference color information and the color information of each block. The CPU 21 generates the correction matrix A by which the reference color information and the color information of each block satisfy Equation (1). The CPU 21 calculates the elements of the correction matrix using the least square method, for example.

The CPU 21 has a function of storing an image of the commodity that has been corrected (by using the correction matrix A) as a dictionary image.

The CPU 21 specifies a region of the captured image corresponding to the commodity 50. The CPU 21 may detect an edge of the commodity 50 from the captured image and thus specify the region in the captured image corresponding to the commodity 50. Upon specifying the region of the captured image corresponding to the commodity 50, the CPU 21 corrects colors in the region of the captured image corresponding to the commodity region (also referred to as a commodity image) using the correction matrix.

For example, the CPU 21 corrects R, G, and B values for each pixel in the commodity image using the correction matrix values on each pixel in the commodity image.

Specifically, the CPU 21 may correct color of the commodity image according to the following Equation (3):

$$\begin{pmatrix} R_n \\ G_n \\ B_n \end{pmatrix} = A \begin{pmatrix} R \\ G \\ B \end{pmatrix} \quad \text{Equation (3)}$$

where Rn, Gn, and Bn represent color information of a pixel after the correction and R, G, and B represent color information of the pixel before the color correction.

The CPU 21 assigns a file name to the color-corrected commodity image and stores this corrected commodity image in the NVM 23 as a dictionary image.

The CPU 21 has a function of storing the commodity table that includes information about a commodity.

Figures 4, 5:
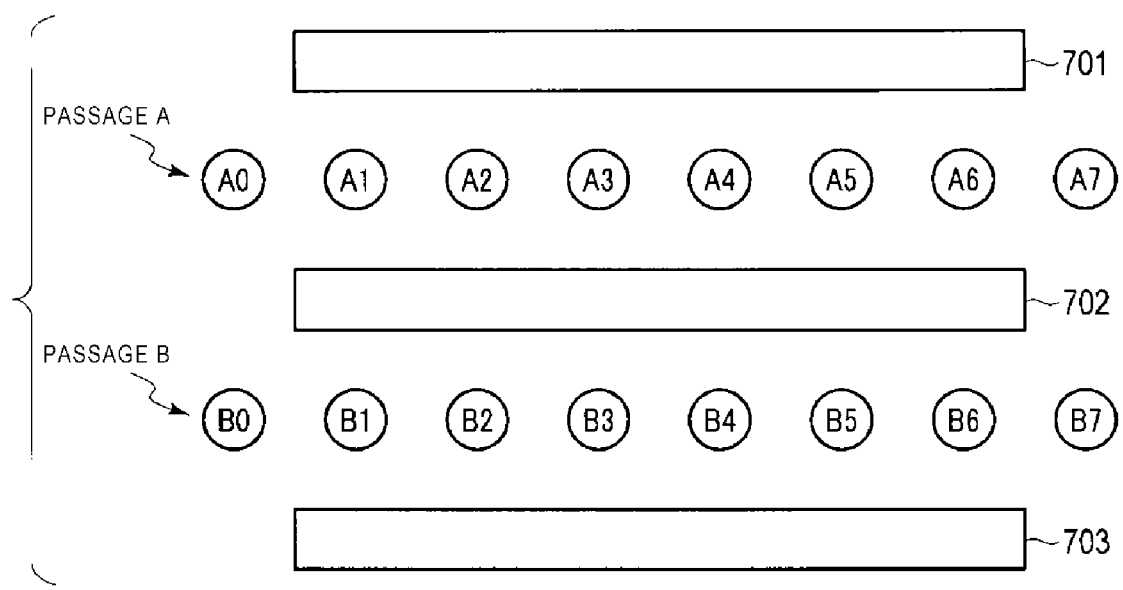
FIG. 4 is a diagram of a commodity table.
FIG. 5 is a diagram of map information.

FIG. 4 illustrates a configuration example of the commodity table.

As illustrated in FIG. 4, the commodity table stores "commodity name", "commodity code", and "dictionary image file name" in a correlated manner.

The "commodity name" is a text name of a commodity.

The "commodity code" is ID for specifying the commodity according to a numerical value, a character string, a symbol, a combination thereof, or the like.

The "dictionary image file name" is a file name under which the dictionary image of the commodity (generated by correcting the commodity image with the correction matrix) is stored.

In the example illustrated in FIG. 4, the commodity table stores "tea", "0000", and "img_0000" as "commodity name", "commodity code", and "dictionary image file name" in a first row.

The CPU 21 acquires a commodity name and a commodity code of the commodity 50. The CPU 21 may receive a commodity name and a commodity code from an operator through an operation unit 104 or the like.

Upon acquiring a commodity name and a commodity code of the commodity 50, the CPU 21 adds the commodity name, the commodity code, and a file name of a dictionary image to the commodity table in a correlated manner.

The CPU 11 has a function of directing movement of the self-driving robot 102 to a predetermined stop position and stopping the self-driving robot 102 at the stop position.

The CPU 11 acquires the map information from the map information apparatus 30. The map information indicates an imaging position corresponding to a commodity shelf in a store. The imaging position is a position at which the camera 103 mounted on the self-driving robot 102 can capture an image of the commodity shelf.

FIG. 5 illustrates a configuration example of map information.

As illustrated in FIG. 5, the map information indicates imaging positions on passage A (A0 to A7) and imaging positions on passage B (B0 to B7).

The passage A is between a commodity shelf column 701 and a commodity shelf column 702. The passage B is between the commodity shelf column 702 and a commodity shelf column 703. Each of the commodity shelf columns 701 to 703 is configured to have a plurality of commodity shelves.

The CPU 11 determines a stop position of the self-driving robot 102 based on a route table.

The route table indicates a stop position of the self-driving robot 102. The route table may indicate a plurality of imaging positions as stop position of the self-driving robot 102. The route table may indicate that the self-driving robot 102 stops sequentially at the plurality of imaging positions.

FIG. 6 illustrates a configuration example of a route table.

As illustrated in FIG. 6, the route table stores "route name" and "stop position" in a correlated manner.

The "route name" is a name for identifying a particular route.

The "stop position" is an imaging position at which the self-driving robot 102 can stop and then from which an image of the commodity 50 can be captured. There may be a plurality of "stop positions". The self-driving robot 102 may be stopped sequentially at one of several different imaging positions along a route.

In the example illustrated in FIG. 6, the route table indicates that the stop positions in the "route 1" are A0 to A7. The route table indicates that in "route 1" the self-driving robot 102 stops sequentially at A0 to A7.

The CPU 11 selects a route from the route table. The CPU 11 may select a route based on an operator's instruction received via the operation unit 104. The CPU 11 may set a route according to a predetermined condition.

The CPU 11 causes the self-driving robot 102 to stop at a stop position according to the selected route. The CPU 11 causes the self-driving robot 102 to move to and stop at a first stop position indicated by the route. The CPU 11 causes the self-driving robot 102 to move to and stop at stop positions in an order indicated by the route.

FIGS. 7 and 8 illustrate operation examples in which the CPU 11 causes the self-driving robot 102 to stop at a predetermined position, for example, A4. FIG. 7 is a diagram of a store having commodity shelves 701, 702, and 703 installed, viewed from the top. FIG. 8 is a diagram of the commodity shelves 701 and 702 in the store, viewed horizontally.

Here, the CPU 11 selects "route 1" from the route table along the commodity shelf 701. When the self-driving robot 102 is at A3, the CPU 11 transmits a signal, to the self-driving robot 102, for instructing to move to and stop at A4.

The self-driving robot 102 moves to and stops at A4 according to the signal.

The CPU 11 has a function of adjusting the imaging position based on an image of a commodity and the calibration plate 60 captured by the camera 103

After the self-driving robot 102 has stopped at a predetermined position, the CPU 11 transmits a signal, to the camera 103, for capturing an image of the commodity shelf 701. The camera 103 captures an image according to the signal. The camera 103 transmits the captured image to the CPU 11. The CPU 11 acquires the captured image from the camera 103.

Figure 9:
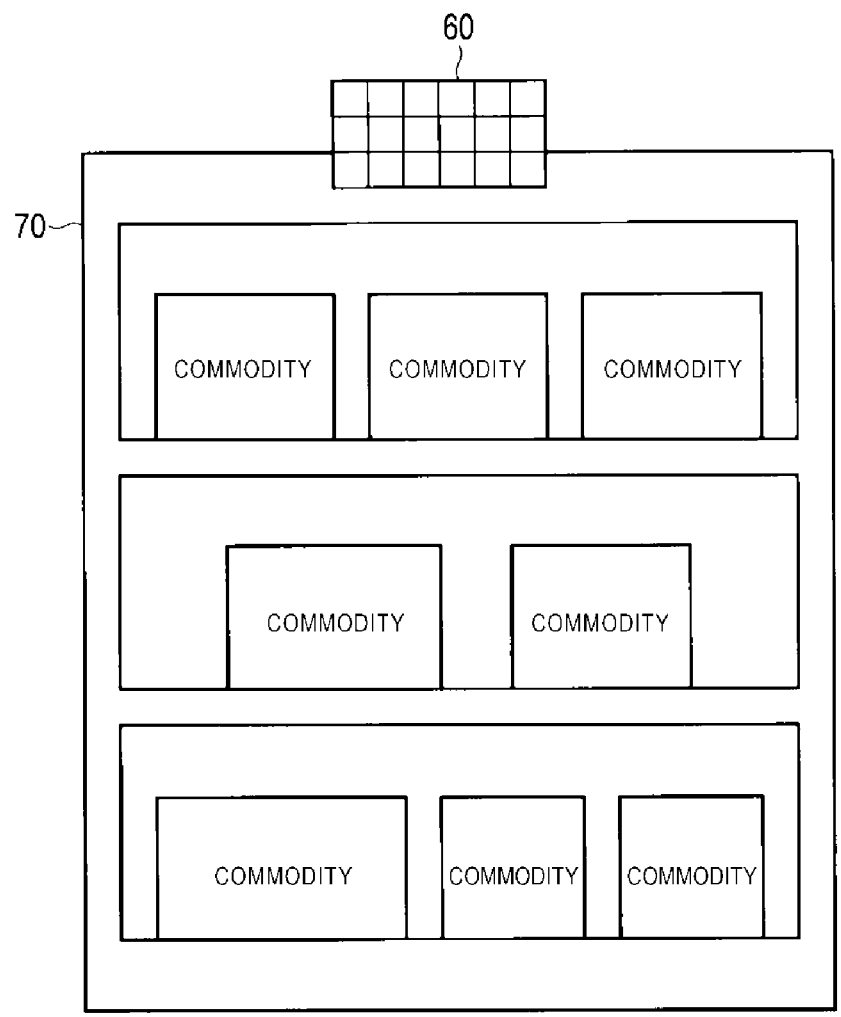
FIG. 9 is a diagram of a dictionary image storage apparatus.
Figure 9:
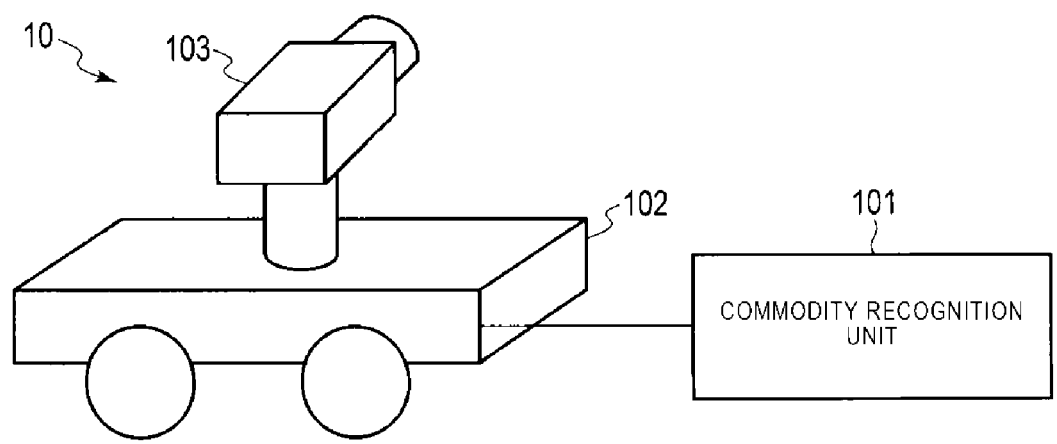

FIG. 9 illustrates an operation example in which the CPU 11 acquires an image of a commodity and the calibration plate 60.

As illustrated in FIG. 9, a plurality of commodities is disposed in a commodity shelf 70. The type or the number of the commodities disposed in the commodity shelf 70 is not limited to a specific type or number.

The calibration plate 60 is installed at a predetermined position of the commodity shelf 70. In the example illustrated in FIG. 9, the calibration plate 60 is installed at the top of the commodity shelf 70. The calibration plate 60 may be installed near the commodity shelf 70. The location of the calibration plate 60 is not limited to a specific location, but the calibration plate 60 may be disposed at any predetermined position near a commodity shelf.

After the self-driving robot 102 has stopped at a predetermined position, for example, A4, the CPU 11 acquires an image captured by the camera 103. Upon detecting that the self-driving robot has stopped at A4, the CPU 11 transmits a signal, to the camera 103, for capturing an image of the commodity shelf. The camera 103 captures an image according to the signal. Here, the camera 103 captures an image of the commodity shelf 70 and the calibration plate 60. The camera 103 transmits the captured image to the CPU 11. The CPU 11 acquires the captured image from the camera 103.

The CPU 11 extracts an image of the calibration plate 60 from the captured image. For example, the CPU 11 extracts the image of the calibration plate 60 from the captured image using pattern detection or the like.

Upon extracting the image of the calibration plate 60, the CPU 11 detects a pixel position in the captured image of the calibration plate 60 from the extracted image. The CPU 11 adjusts the stop position of the self-driving robot 102 such that the calibration plate 60, which has been installed at a predetermined position on a commodity shelf, is at a predetermined pixel position in the image. For example, the CPU 11 controls the self-driving robot 102, by instructing the self-driving robot 102 to move forward, backward, and rotate, so the calibration plate 60 will be displayed at the predetermined pixel position in the image.

The CPU 11 has a function of acquiring the image including the commodity and the calibration plate 60 using the camera 103 or an image acquisition unit.

Upon completing the position adjustment of the self-driving robot 102, the CPU 11 acquires another image using the camera 103.

The CPU 11 generates a correction matrix based on the calibration plate 60 in the image captured after the position adjustment.

For example, the CPU 11 extracts an image of the calibration plate 60 from the image captured after repositioning of the self-driving robot 102 using a pattern recognition algorithm or the like.

Upon extracting the image of the calibration plate 60, the CPU 11 extracts color information for each block on the calibration plate 60. The CPU 11 detects a position of each block from the extracted image. The CPU 11 extracts color information of the position of each block. Here, the color information corresponds to a color value in RGB format.

Upon extracting the color information, the CPU 11 generates the correction matrix based on the reference color information, included in the reference color table stored in the storage region 13a, and the color information extracted from the captured image of the calibration plate 60.

Since the method of generating the correction matrix by the CPU 11 is the same as the method of generating a correction matrix by the CPU 21, a detailed description thereof will be omitted.

The CPU 11 has a function of correcting the captured image using the correction matrix.

The CPU 11 may correct color information (R, G, and B values) of each pixel in the captured image.

Specifically, the CPU 11 corrects the color of the captured image according to Equation (3), described above.

The CPU 11 has a function of recognizing a commodity in the captured image using the color-corrected captured image of the commodity shelf.

The CPU 11 acquires a dictionary image from the dictionary image storage apparatus 20. The CPU 11 recognizes the commodity from the corrected captured image by using the dictionary image. The CPU 11 calculates image feature data from the dictionary image, and then searches for matching image feature data in the corrected captured image.

The CPU 11 searches for an image region with a coincidence ratio (matching score) exceeds a predetermined threshold value. For example, the CPU 11 searches for a matching image region by raster scan or the like. Upon finding a matching image region, the CPU 11 determines the commodity matching the dictionary image is at the position of the region.

The CPU 11 then masks or excludes this matching image region from the corrected captured image and further attempts to find additional matching regions using image feature data matching. If no other region of the corrected captured image can be found, the CPU 11 terminates the detection process for the commodity corresponding to the dictionary image.

If there is another dictionary image to evaluate, the CPU 11 performs the same operation with the other dictionary image. The CPU 11 repeats the operation but this time using the other dictionary image stored in the dictionary image storage apparatus 20 to recognize the corresponding commodity.

The CPU 11 may acquire the dictionary images from the dictionary image storage apparatus 20 one by one or acquire several dictionary images at once.

The method of detecting a commodity by the CPU 11 is not limited to the example described above.

The CPU 11 may acquire a commodity name and a commodity code of a detected commodity by referencing the commodity table stored in the dictionary image storage apparatus 20. The CPU 11 may transmit the acquired commodity name and commodity code to the missing commodity recognition apparatus 40.

Next, an operation example of the CPU 21 of the dictionary image storage apparatus 20 will be described.

First, an operation example in which the CPU 21 stores a dictionary image will be described.

Figure 10:
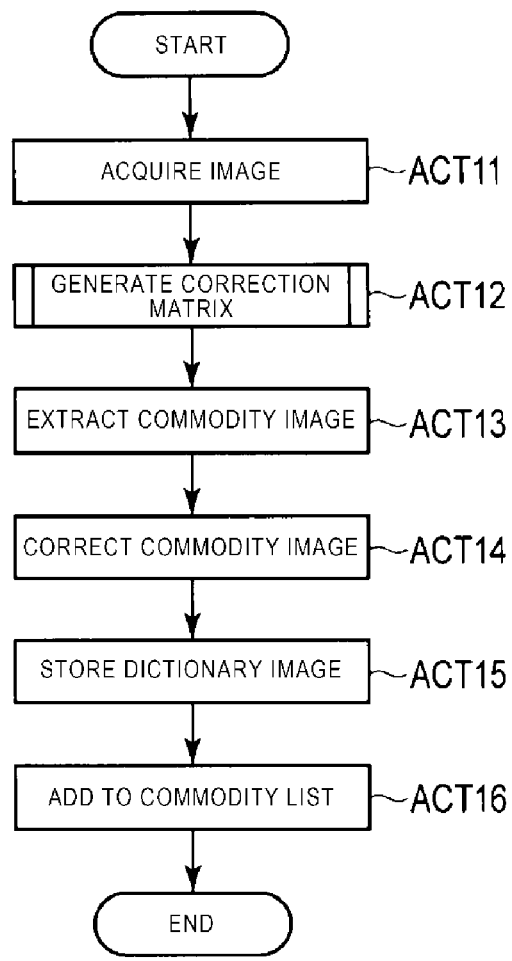
FIG. 10 is a flowchart of an operation of a dictionary image storage apparatus.

FIG. 10 is a flowchart of an operation example in which the CPU 21 stores a dictionary image.

First, the CPU 21 captures or otherwise acquires an image of a commodity and the calibration plate 60 using the camera 26 (ACT 11). Upon acquiring the captured image, the CPU 21 generates a correction matrix based on the captured image (ACT 12).

After generating the correction matrix, the CPU 21 extracts an image of the commodity from the captured image (ACT 13). Upon extracting the image, the CPU 21 corrects the image with the correction matrix (ACT 14). Upon correcting the image using the correction matrix, the CPU 21 stores the corrected image of the commodity as a dictionary image in the NVM 13 (ACT 15).

Upon storing the dictionary image in the NVM 13, the CPU 21 adds to a commodity list a commodity name, a commodity code, and a dictionary image file name of the dictionary image in a correlated manner (ACT 16).

Upon adding the names and codes to the commodity list, the CPU 21 terminates the operation.

If a plurality of captured images is acquired, the CPU 21 repeats ACTs 11 to 16 for each captured image.

In some embodiments, the CPU 21 may execute ACT 12 after ACT 13.

Next, an operation example in which the CPU 21 generates the correction matrix (ACT 12) will be described.

Figure 11:
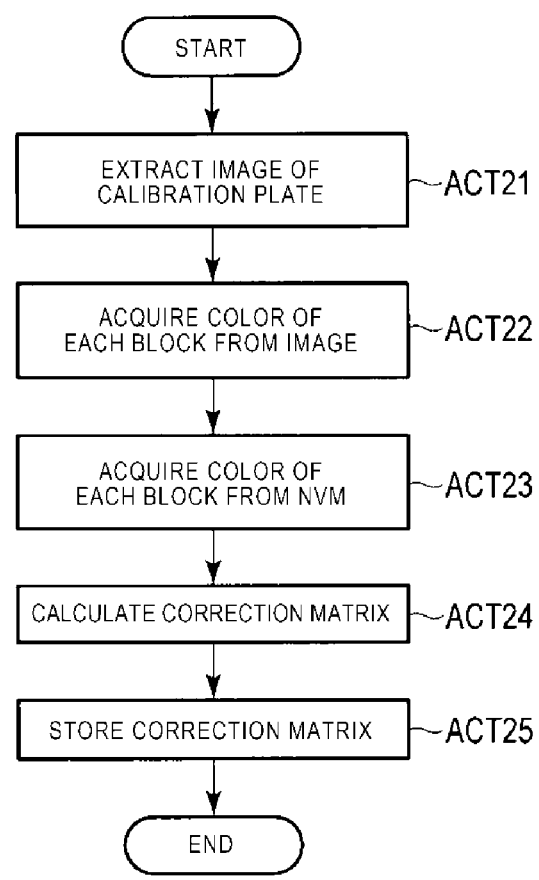
FIG. 11 is a flowchart of an operation of a dictionary image storage apparatus.

FIG. 11 is a flowchart of an operation example in which the CPU 21 generates the correction matrix (ACT 12).

The CPU 21 extracts a region of the captured image corresponding to the calibration plate 60 (ACT 22). Upon extracting the region of the captured image corresponding to the calibration plate 60, the CPU 21 acquires color information of each block of the calibration plate 60 from the extracted image (ACT 23).

Upon acquiring the color information of each block, the CPU 21 acquires reference color information of each block from the reference color table (ACT 23). Upon acquiring the reference color information of each block, the CPU 21 generates the correction matrix based on the color information and reference color information (ACT 24).

Upon generates the correction matrix, the CPU 21 stores the generated correction matrix in the RAM 12 or the NVM 13 (ACT 25). Upon storing the correction matrix, the CPU 21 terminates the operation.

The CPU 21 may execute ACT 22 after ACT 23.

Next, an example of an operation of the CPU 11 will be described.

First, an example in which the CPU 11 recognizes a commodity will be described.

Figure 12:
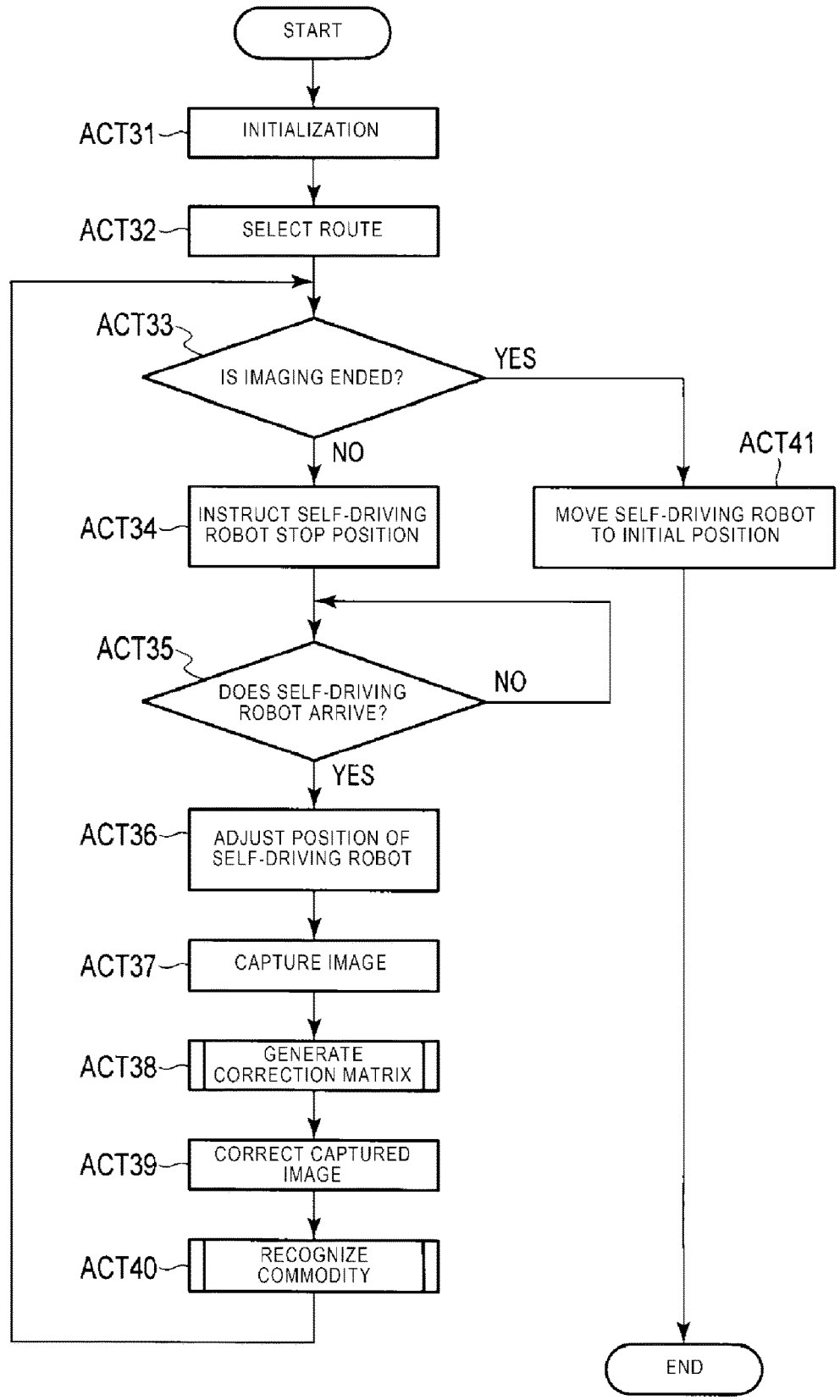
FIG. 12 is a flowchart of an operation of an image processing apparatus.

FIG. 12 is a flowchart of an example in which the CPU 11 detects the commodity.

The CPU 11 initializes the image processing apparatus 10 (ACT 31). Upon initializing the image processing apparatus 10, the CPU 11 selects a route from the route table (ACT 32).

After selecting the route, the CPU 11 determines whether commodity imaging has been completed (ACT 33). The CPU 11 determines whether an image has been captured at each stop position in the selected route.

Upon determining that imaging has not been completed at a stop position (ACT 33, NO), the CPU 11 instructs the self-driving robot 102 to move to and stop at the stop position (ACT 34). Upon instructing the self-driving robot 102 to move to and stop at the stop position, the CPU 11 determines whether the self-driving robot 102 has stopped at the stop position (ACT 35).

Upon determining that the self-driving robot 102 has not stopped at a stop position (ACT 35, NO), the CPU 11 returns to ACT 35.

Upon determining that the self-driving robot 102 has stopped at the stop position (ACT 35, YES), the CPU 11 acquires an image using the camera 103 and, as necessary, adjusts the position of the self-driving robot 102 (ACT 36). After adjusting the position of the self-driving robot 102, the CPU 11 acquires an image using the camera 103 (ACT 37). The CPU 11 then generates a correction matrix based on the captured image (ACT 38).

The CPU 11 then corrects the captured image using the correction matrix (ACT 39). CPU 11 then detects the commodity in the corrected captured image (ACT 40).

After detecting the commodity, the CPU 11 returns to ACT 33.

Once the imaging has been completed (ACT 33, YES), the CPU 11 causes the self-driving robot 102 to move to an initial position (ACT 41). Upon causing the self-driving robot 102 to move to the initial position, the CPU 11 terminates the operation.

Since an operation example in which the CPU 11 generates a correction matrix (ACT 38) is the same as in FIG. 11, repeated description will be omitted.

Figure 13:
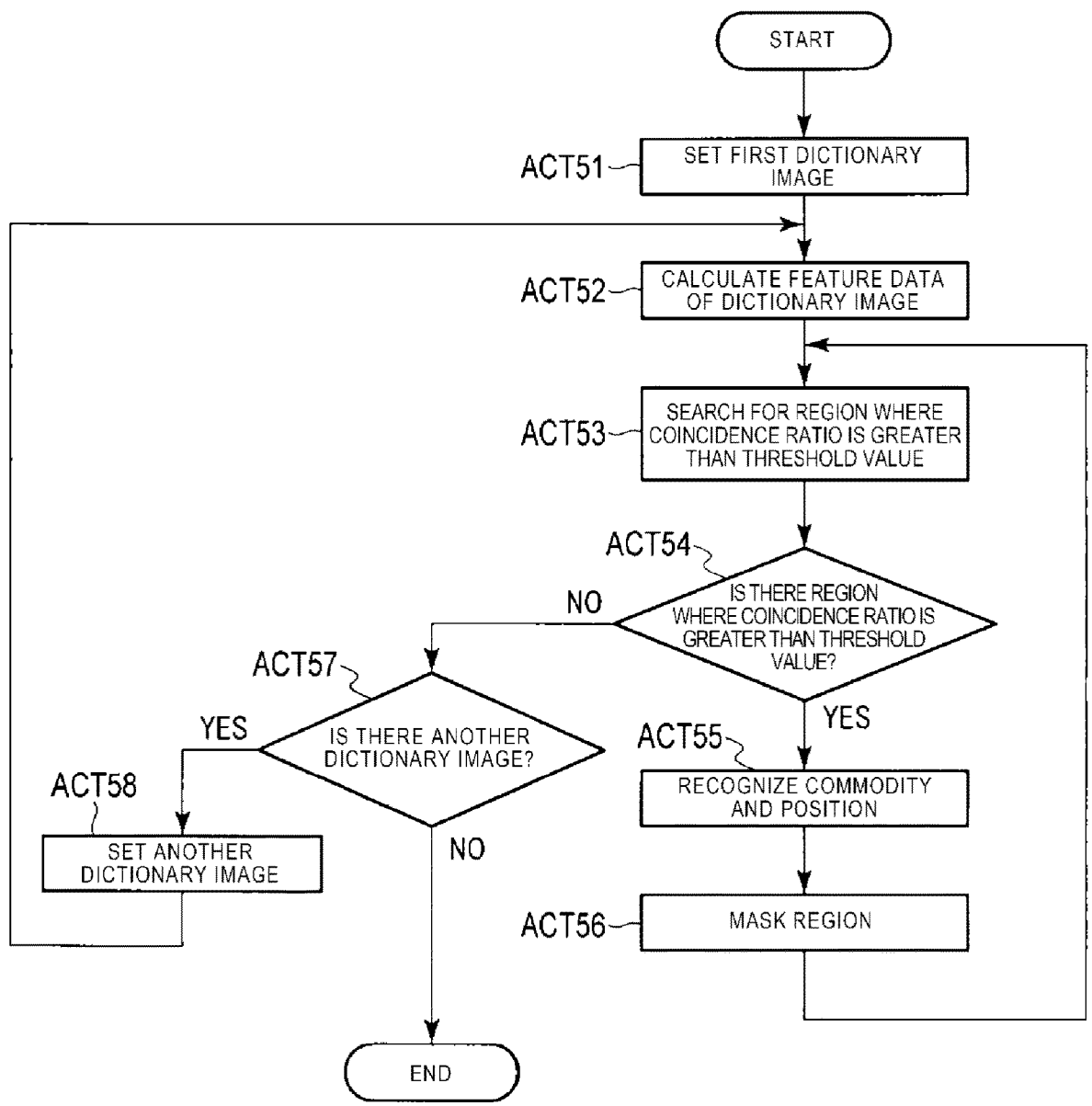
FIG. 13 is a flowchart of an operation of an image processing apparatus.

FIG. 13 is a flowchart of an operation example in which the CPU 11 recognizes or detects a commodity.

The CPU 11 selects a dictionary image (ACT 51). The CPU 11 acquires this dictionary image from the dictionary image storage apparatus 20. Upon selecting the dictionary image, the CPU 11 calculates image feature data for the dictionary image (ACT 52). The CPU 11 then searches for a region of the corrected captured image having image features that coincides with image feature of a region of the dictionary image at a ratio (matching score) exceeding a predetermined threshold value (ACT 53).

Upon finding a region where a coincidence ratio of the feature data exceeds a predetermined threshold value (ACT 54, YES), the CPU 11 determines the commodity registered in the dictionary image is at a position corresponding to the region of the corrected captured image (ACT 55). Upon detecting the commodity depicted in the dictionary image at the position corresponding to the region of the corrected captured image, the CPU 11 masks the region of the corrected captured image that has been found in ACT 55 (ACT 56). Upon masking the region of the corrected captured image, the CPU 11 returns to ACT 53.

Upon finding no region of the corrected captured image having image features that coincide with image features of the dictionary image at a coincidence ratio exceeding the predetermined threshold value (ACT 54, NO), the CPU 11 next determines whether there is another dictionary image to evaluate for matching in the corrected captured image (ACT 57). Upon determining that there is another dictionary image (ACT 57, YES), the CPU 11 selects another dictionary image (ACT 58). Upon selecting the other dictionary image, the CPU 11 returns to ACT 52.

Upon determining that there is no other dictionary image to evaluate for matching (ACT 57, NO), the CPU 11 terminates the operation.

In some embodiments, the self-driving robot 102 may incorporate the commodity recognition unit 101.

In some embodiments, the image processing apparatus 10 need not include the self-driving robot 102. For example, the CPU 11 may detect a commodity from an image captured by the camera 103 according to an operator's instruction or manipulation.

The image processing apparatus 10 and the dictionary image storage apparatus 20 may be integrated.

In the above-described embodiments, the image processing system generates a correction matrix that alleviates imaging variations that might be caused by the influence of camera characteristics, external lighting, or the like using an image of a calibration plate in the captured image. The image processing system then corrects a captured image using the correction matrix. The image processing system detects a commodity in the corrected image. Accordingly, the image processing system detects the commodity more reliably from the captured image. As a result, the image processing system can prevent the detection accuracy of the commodity from deteriorating due to the influence of camera characteristics, external light or the like. Thus, the image processing system can more effectively recognize the commodity.

Also, as the camera captures an image of a commodity shelf and a calibration plate, which can have a known physical location, a self-driving robot can adjust its position based on its relative positioning with respect to the calibration plate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A color correction apparatus for a merchandise image, comprising:
    a first interface circuit connectable to a memory;
    a second interface circuit connectable to a camera; and
    a processor configured to:
        acquire dictionary images of merchandises from the memory via the first interface circuit;
        issue a control signal to the camera via the second interface circuit, to acquire an image of a shelf displaying a merchandise;
        detect a calibration plate in the image of the shelf;
        calculate a color correction value for the image according to a color of a block of the calibration plate, the color of the block matching a reference color;
        correct color in the image of the shelf using the calculated color correction value to provide a color-corrected image; and
        compare the color-corrected image of the merchandise to each of the dictionary images and identify the merchandise in the image of the shelf.

2. The color correction apparatus according to claim 1, wherein
    the calibration plate includes a plurality of blocks having colors that match different reference colors.

3. The color correction apparatus according to claim 2, wherein
    the processor is configured to generate a correction matrix for correcting R, G, and B values of each pixel of the image.

4. The color correction apparatus according to claim 1, further comprising:
    a robot configured to move along a route including a plurality of predetermined stopping positions, wherein
    at each predetermined stopping position a calibration plate is disposed at a position viewable by the camera, and
    the processor issues a control signal to the camera to acquire an image at each predetermined stopping position.

5. The color correction apparatus according to claim 4, wherein
    the processor is configured to adjust a position of the robot at each predetermined stopping position by reference to a detected position of the calibration plate in the image captured using the camera at the predetermined stopping position, and
    the processor is configured to issue a control signal to the camera to acquire another image if the position of the robot has been adjusted.

6. The color correction apparatus according to claim 4, wherein
    the camera is mounted on the robot.

7. The color correction apparatus according to claim 1, wherein
    the memory is an external non-volatile memory.

8. The color correction apparatus according to claim 1, wherein
    the calibration plate is attached to a predetermined position of the shelf displaying the merchandise.

9. The color correction apparatus according to claim 8, wherein
    the calibration plate is attached on a top portion of the shelf displaying the merchandise.

10. The color correction apparatus according to claim 1, wherein
    the calibration plate is placed adjacent to the merchandise displayed on the shelf.

11. An inventorying apparatus, comprising
    a robot configured to move along a route including a plurality of predetermined stopping positions;
    a camera on the robot;
    a first interface circuit connected to a memory;
    a second interface circuit connected to the camera; and
    a processor configured to:
        acquire dictionary images of merchandises from the memory via the first interface circuit;
        issue a control signal to the camera via the second interface circuit, to acquire an image of a shelf displaying a merchandise at each predetermined stopping position;
        detect a calibration plate in the image of the shelf;
        calculate a color correction value for the image according to a color of a block of the calibration plate, the color of the block matching a reference color;
        correct color in the image of the shelf using the calculated color correction value to provide a color-corrected image; and
        compare the color-corrected image of the merchandise to each of the dictionary images and identify the merchandise in the image of the shelf.

12. The inventorying apparatus according to claim 11, wherein
    the calibration plate includes a plurality of blocks having colors that match different reference colors.

13. The inventorying apparatus according to claim 12, wherein
    the processor is configured to generate a correction matrix for correcting R, G, and B values of each pixel of the image.

14. The inventorying apparatus according to claim 11, wherein
    the processor is configured to adjust a position of the robot at each predetermined stopping position by reference to a detected position of the calibration plate in the image captured using the camera at the predetermined stopping position, and
    the processor is configured to issue a control signal to the camera to acquire another image if the position of the robot has been adjusted.

15. The inventorying apparatus according to claim 11, wherein
    the memory is an external non-volatile memory.

16. An inventory tracking method comprising:
acquiring dictionary images of merchandises from a memory;
moving a robot along a route including a plurality of predetermined stopping positions;
acquiring an image of a shelf displaying a merchandise using a camera on the robot at each predetermined stopping position;
detecting a calibration plate in the image, wherein the calibration plate includes a block having a color that matches a reference color;
calculating a color correction value for the image according to the color of the block of the calibration plate;
correcting color in the image of the shelf using the calculated color correction value to provide a color-corrected image; and
comparing the color-corrected image of the merchandise to each of the dictionary images and identifying the merchandise in the image of the shelf.

17. The inventory tracking method according to claim 16, wherein
the calibration plate includes a plurality of blocks having different colors matching different reference colors.

18. The inventory tracking method according to claim 17, further comprising:
generating a correction matrix for correcting R, G, and B values of each pixel of the image.

19. The inventory tracking method according to claim 16, further comprising:
adjusting a position of the robot at each predetermined stopping position by reference to position of the calibration in the image captured using the camera at the predetermined stopping position; and
acquiring another image including the calibration plate if the position of the robot has been adjusted.

20. The inventory tracking method according to claim 16, wherein
the memory is an external non-volatile memory.

* * * * *